Patented June 26, 1951

2,558,507

UNITED STATES PATENT OFFICE 2,558,507

PRODUCTION OF THIOPHENE COMPOUNDS FROM MONO-OLEFINS AND HYDROGEN SULFIDE WITH ALUMINA CATALYST

Walter G. Appleby, Houston, and Albin F. Sartor, Pasadena, Tex., assignors to Shell Development Company, San Francisco, Calif., a corporation of Delaware No Drawing. Application September 5, 1945, Serial No. 614,616

6 Claims. (Cl. 260—332.8)

This invention relates to the production of organic sulfur compounds and relates more particularly to the production of unsaturated cyclic organic sulfur compounds of the class consisting of thiophenes.

The unsaturated cyclic sulfur compounds containing the sulfur atom in the ring, such as the thiophenes, are valuable as starting or intermediate materials in the production of a wide variety of products including dyes, pharmaceuticals and many other chemical derivatives. Their production by methods disclosed heretofore, however, is uneconomical and beset with difficulties which mitigate against their practical utilization on a large scale. Methods available heretofore for their synthesis under conditions resulting in the obtaining of a thiophene product of sufficient purity, without the simultaneous production in relatively large quantities of undesired by-products, are generally of so intricate or expensive a nature as to render them economically unattractive. Such methods, furthermore, rely upon the utilization as starting materials of substances not readily available and the manufacture of which often renders subsequent production of the sulfur compounds therefrom highly uneconomical. Further inherent disadvantages of many of these processes is the hazardous nature of the materials used as initial starting material, as well as the poor yields thereby obtained. Other sources of these compounds, available heretofore, include the by-products of processes, the operating conditions of which are directed to the production or processing of materials other than thiophenes as the main product, and consequently are unreliable not only with respect to the amount but the nature and state of purity of the compounds thus obtained.

It has now been found that unsaturated cyclic organic sulfur compounds of the class consisting of thiophenes are obtained with substantially improved efficiency from readily available mono-olefins and hydrogen sulfide under the well defined conditions and the catalysts of the present invention. The highly efficient and relatively inexpensive process of the invention not only bring within the realm of practicability the large scale production of thiophenes, but makes possible such large scale production with unusually high yields. Not only can thiophenes be made to predominate in the reaction products obtained while limiting the formation of by-products to substantially only valuable hydrogen and carbon disulfide, but by selection of the particular mono-olefin charged, and control of operating conditions, liquid reaction products are obtained consisting substantially only of thiophenes.

In accordance with the process of the invention thiophenes are produced by reacting a mono-olefin with hydrogen sulfide in the presence of a solid catalytic material consisting essentially of alumina, or an aluminous material, under the well defined operating conditions defined fully herein.

Mono-olefins suitable as starting materials for the process of the invention comprise the normally gaseous and normally liquid unsaturated hydrocarbons having at least two carbon atoms to the molecule and containing a single olefinic bond between two adjacent carbon atoms and containing no other carbon to carbon unsaturation. Suitable mono-olefins comprise for example ethylene, propylene, butylene-1, butylene-2, isobutylene, the amylenes as pentene-1, pentene-2, 2-methyl-butene-3, 2-methyl-butene-1, 2-methyl-butene-2 and 2-methyl-butene-3, the hexlenes as hexene-1, hexene-2, hexene-3, 2-methyl-pentene-4, 2-methyl-pentene-3, 3-methyl-pentene-4, 2-methyl-pentene-1, 2-methyl-pentene-2, 3-methyl-pentene-2, 2,3-dimethyl-butene-1 and 2,3-dimethyl-butene-2, the heptylenes, the octylenes, the nonylenes, the decylenes, undecylenes and the like. The mono-olefins may be further substituted by the replacement of one or more of the hydrogen atoms by alkyl, aryl, aralkyl, cycloalkyl, or heterocyclic groups, as well as halogens. The particular mono-olefins chosen as charge material will of course be governed by the nature of the product desired. The hydrocarbon charge need not necessarily consist of a single mono-olefin, and two or more mono-olefins may be comprised in the charge to the process. The hydrocarbon charge may comprise materials other than the mono-olefins, capable of acting as diluents, temperature or flow controlling means, etc. Such materials which may be included in the hydrocarbon charge comprise gases and vapors having no adverse effect upon the execution of the desired reaction, such as, for example, normally gaseous and normally liquid saturated hydrocarbons, nitrogen, hydrogen, carbon dioxide and the like. Suitable charge material comprises hydrocarbon mixtures or fractions containing substantial amounts of the mono-olefins, such as, for example, the ethylene, propylene, butylene, amylene in fractions obtained by fractionation of naturally occurring hydrocarbon mixtures or of products of refinery operations. Waste or off-gases, rich in mono-olefins, from many petroleum refinery operations are particularly desirable starting materials for the process of the invention.

The hydrogen sulfide to be reacted with the mono-olefin charge is introduced into the system in admixture with the mono-olefins; or it may be introduced in part, or in its entirety, in a separate stream to the inlet or any intermediate point or points of the reaction zone. The ratio of hydrogen sulfide to mono-olefins charged may vary within the scope of the invention. It is preferred, however, to add sufficient hydrogen sulfide to maintain a mole ratio of hydrogen sulfide to mono-olefins in the charge of at least 1:1 and not substantially in excess of about 10:1. Still more preferably the mole ratio of hydrogen sulfide to mono-olefins is maintained in the range of from about 2:1 to about 6:1. Optimum results are obtained by maintaining the mole ratio of hydrogen sulfide to mono-olefins at about 3:1 to 4:1, particularly when utilizing normally gaseous mono-olefins as the hydrocarbon charge. Thus, whereas in the reaction of butylene with the hydrogen sulfide, utilizing a mole ratio of hydrogen sulfide to butylene of 1:1 the maximum conversion obtained was 20%, an increase of the hydrogen sulfide to butylene ratio to 3.5:1 increased the conversion to 35%. Higher ratios of hydrogen sulfide may however be employed within the scope of the invention.

The hydrogen sulfide charged to the reaction need not necessarily be pure hydrogen sulfide and may comprise any suitable hydrogen sulfide-containing gas or vapor, the components other than the hydrogen sulfide of which have no substantial deleterious effect upon the execution of the reaction. Thus the hydrogen sulfide may be employed in the form of a gaseous mixture comprising the hydrogen sulfide in admixture with a gas or vapor such as, for example, hydrogen, nitrogen, normally gaseous paraffins, etc. The gaseous component of the hydrogen sulfide mixture may function to aid in maintaining the hydrogen sulfide within the prescribed concentration as well as to control conditions of temperature, time of contact, etc.

Efficient production of thiophenes in accordance with the process of the invention requires the presence of a catalyst, or contact material consisting essentially or predominantly of alumina. The solid alumina catalysts, or contact materials, employed in the present invention comprise the solid aluminous materials from any suitable source. They include the naturally occurring aluminum oxide minerals, or ores, as well as the synthetically prepared aluminas or materials consisting of, or predominating in, aluminum oxides. A particularly desirable naturally occurring alumina is bauxite. Suitable aluminous materials are also obtained by treatment of naturally occurring minerals, or ores, containing aluminum in forms other than the oxide to convert at least a substantial part of the aluminum content to the oxide. Thus the naturally occurring mineral Dawsonite, containing aluminum in the form of

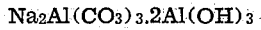

$$Na_2Al(CO_3)_3 \cdot 2Al(OH)_3$$

for example, is converted by calcining to a suitable aluminum oxide-containing material.

Of the available aluminas or aluminous materials the use of the adsorptive aluminas, or adsorptive aluminous materials, is preferred. The aluminas or aluminous materials, whether of natural or synthetic origin may be subjected to any suitable activating treatment rendering them adsorptive or enhancing their inherent adsorptive properties or otherwise increasing their activity. Such activation treatments may comprise any of the known activating treatments and may include for example one or more of such steps as treatment with mineral acids, calcining in the absence or presence of added gases such as hydrogen, nitrogen, carbon dioxide, saturated hydrocarbons, oxygen, steam, etc. Suitable activation resulting in an adsorptive catalyst of enhanced activity is generally obtained by heating the alumina or aluminous material at a temperature in the range of, for example, from about 500° C. to about 800° C.

Although an outstanding feature of the invention comprises the use of alumina catalysts consisting essentially or predominantly only of alumina, the presence of other materials in minor amounts, such as for example, difficultly reducible metal oxides as chromium oxide, magnesium oxide, zinc oxide, alkaline earth oxides, etc., or minor amounts of iron oxide, are not objectionable and their addition may even be resorted to within the scope of the invention to modify the nature of the particular alumina or aluminous material employed. The alumina or aluminous materials may furthermore be used in admixture with lesser amounts of solid diluent materials. Such diluent materials comprise, for example, crushed firebrick, crushed silica, silica stone, carbon, pumice, crushed sandstone, marble, majolica chips, ceramic bodies, porous aggregates, as well as certain naturally occurring minerals as magnesite, brucite, and the like.

Particularly desirable catalysts comprise the adsorptive aluminas possessing the physical structure and surface characteristics of the "activated alumina" of commerce. These materials known in the industry as "activated alumina" have been prepared and sold in this country since 1930 and find application, among other uses, in the adsorption of gases and vapors from gaseous mixtures. "Activated alumina" has been so named because of its active adsorptive properties for gases and vapors.

Although the invention is not limited to the use of a particular alumina or aluminous material in its execution, of the adsorptive aluminas or adsorptive aluminous materials, those consisting essentially or predominantly of bauxite or "activated alumina," because of the efficient results obtained therewith, are preferred. A preferred bauxite catalyst comprises the activated bauxite known and sold under the trade-name "Porocel."

A critical factor in the execution of the process of the invention resides in the temperature employed. Thus the temperature of reaction is maintained above 400° C. and preferably not substantially above 750° C. At lower temperatures reaction products predominating in sulfur compounds other than the desired thiophenes are generally produced. At temperatures above 750° C., a rapid decline of catalyst as well as lower yields are generally encountered. It is preferred to maintain the temperature in a range of from about 450° C. to about 650° C. Still more preferred temperatures, particularly when charging normally gaseous mono-olefins, comprises the temperature range of from about 500° C. to about 570° C. A contact time of from about 10 to 30 seconds is preferred.

The process of the invention is carried out at subatmospheric, atmospheric or superatmospheric pressures. It is preferred, however, to utilize slightly elevated pressures ranging, for example, from about 50 pounds per square inch absolute to about 500 pounds per square inch absolute.

Under the above-defined conditions excellent conversions of mono-olefins to thiophenes are obtained with long catalyst life. Thus the reaction of butylene with hydrogen sulfide under these conditions will result in the production of a liquid product consisting essentially only of thiophene. Contrary to results obtainable utilizing processes disclosed heretofore the final products of the invention are substantially free of mercaptans. The excellent results obtained in the production of thiophene from butylene in accordance with the process of the invention are evidenced by the following example.

*Example I*

A mixture of 1-butylene and hydrogen sulfide containing a mole ratio of hydrogen sulfide to butylene of 4:1 was passed over adsorptive alumina ("activated alumina") at a temperature of 600° C., atmospheric pressure and a contact time of 15 seconds. 26.8 mole percent of the butylene charged reacted to give a liquid product containing 90 mole percent thiophene. No perceptible amount of mercaptans was found in the reaction products. Effluence from the reactor was passed successively through a water-cooled condenser, two cold traps maintained at −50° C. to −60° C., and three caustic scrubbers. Additionally observed results were as follows:

Mole percent of butylene reacted _____ 26.8
Mole percent of butylene charged converted to:
   Thiophene _____ 26.1
   Carbon disulfide _____ 0.7
Yields in moles per 100 moles of butylene reacted:
   Hydrogen _____ 323
   Thiophene _____ 97
   Carbon disulfide _____ 12

The operation was terminated after 13 hours of continuous operation at which time the catalyst still maintained its optimum activity.

A particularly advantageous feature of the invention resides in its ability to employ as the mono-olefin charge any of the readily available normally gaseous hydrocarbons. Results obtained when reacting ethylene with hydrogen sulfide under the conditions of the invention are illustrated by the following examples:

*Example II*

A mixture of ethylene and hydrogen sulfide containing a mole ratio of hydrogen sulfide to ethylene of 3:1 was passed over adsorptive alumina ("activated alumina") at a temperature of 590° C. A space velocity, in terms of volume of gaseous charge to volume of catalyst per hour, of 360 was maintained. The total liquid product obtained consisted predominantly of thiophene.

*Example III*

A mixture of ethylene and hydrogen sulfide, containing a mole ratio of hydrogen sulfide to ethylene of 3:1, was passed over adsorptive alumina ("activated alumina") at a temperature of 600° C. and atmospheric pressure. The contact time was 10 seconds. The catalyst was pretreated with nitrogen and then with hydrogen sulfide prior to the operation. 50 mole percent of the total liquid consisted of thiophene. The remainder of the liquid product consisted predominantly of carbon disulfide. No presence of mercaptans in detachable amount was evidenced. After caustic treatment, the liquid product had the following properties: Density $D_4^{20}=1.160$, refractive index $N_D^{20}=1.5767$, and had a total sulfur content of 64% by weight (including 8% by weight of free sulfur).

*Example IV*

A mixture of ethylene and hydrogen sulfide, containing a mole ratio of ethylene to hydrogen sulfide of 4:1, was passed over adsorptive alumina (Harshaw grade A activated alumina) at a temperature of 600° C. and atmospheric pressure. A contact time of 15 seconds was employed. Before initiating the run the catalyst was flushed with nitrogen and pretreated with $H_2S$ at 600° C. The effluence from the reactor was passed successively through a water cooled condenser and two traps maintained at −50° C. to −60° C., and three caustic scrubbers. The operation was terminated after 23 hours. Results obtained are indicated in the following table under column A.

Catalyst used in the above run was regenerated by successive treatment with oxygen and hydrogen at a temperature of 600° C. The thus regenerated catalyst was then pretreated with hydrogen sulfide at 600° C. A mixture of ethylene and hydrogen sulfide, containing a mole ratio of hydrogen sulfide to ethylene of 4:1, was passed over the regenerated and pretreated catalyst at a temperature of 600° C., atmospheric pressure and a contact time of 15 seconds. Results obtained are indicated in the following table in column B.

| Run | A | B |
|---|---|---|
| Mole per cent of ethylene reacted | 15.3 | 18.1 |
| Mole per cent of ethylene charged converted to: | | |
|   Thiophene | 10.0 | 11.9 |
|   Carbon disulfide | 5.3 | 6.2 |
| Yield—in moles per 100 moles of ethylene reacted: | | |
|   Hydrogen | 294 | 305 |
|   Thiophene | 33 | 33 |
|   Carbon disulfide | 69 | 68 |

No perceptible amount of mercaptans was noted. The runs were terminated after about 22 hours of continuous operation, at which time the yield of liquid product had not fallen appreciably.

The particular thiophene, or thiophenes, predominating in the reaction products obtained in accordance with the process of the invention will depend to some extent upon the particular mono-olefin employed as starting material. Thus while the normally gaseous mono-olefins generally result in a reaction product predominating in unsubstituted thiophene, propylene, as well as the normally liquid mono-olefins, results in the production of products containing alkyl thiophenes as evidenced by the following example:

*Example V*

A mixture of propylene and hydrogen sulfide, containing a mole ratio of hydrogen sulfide to propylene of 4:1, was passed over adsorptive alumina ("activated alumina") at a temperature of 600° C., a pressure of one atmosphere and a contact time of 15 seconds. The catalyst was flushed with nitrogen and pretreated with hydrogen sulfide at a temperature of 600° C. before use in the operation. Effluence from the reactor was passed successively through a water-cooled condenser, two cold traps maintained at −50° C. to −60° C. and three caustic scrubbers. Results observed were as follows:

| | |
|---|---|
| Mole percent of propylene reacted | 6.2 |
| Mole percent of propylene charged converted to dimethylthiophenes | 3.3 |
| Yield in moles per 100 moles of propylene reacted: | |
| Hydrogen | 363 |
| Dimethylthiophenes | 27 |
| Carbon disulfide | 94 |

It is seen from the foregoing examples that the products other than thiophenes generally consist essentially only of carbon disulfide and hydrogen. A particular advantage of the invention resides in the ability to thus produce, efficiently and cheaply, relatively large amounts of hydrogen from readily available materials. When hydrogen is a particularly desired product, conditions are adjusted to favor the yield of this material. The hydrogen obtained may be utilized in certain subsequent conversions of the sulfur compounds obtained to derivative materials.

The process of the invention provides an economical source for hydrogen consumed or employed in other processes. Such other processes may be operated in combination with the process of the invention. The hydrogen obtained also finds utilization in the process of the invention. It may be recycled in part through the reaction zone and used in the pretreating or regeneration of the catalyst.

As pointed out above, the mono-olefin charge to the process need not consist of pure mono-olefins. Hydrocarbon fractions or mixtures comprising a substantial amount of at least one mono-olefin may be employed as the charge to the system. This is evidenced by the following example:

*Example VI*

In a series of separate and independent operations, a hydrocarbon mixture predominating in hydrocarbons having four carbon atoms to the molecule, in admixture with hydrogen sulfide, was passed through a vertical reactor containing a bed of alumina. Reaction products from the reactor were passed into a low temperature condenser and thence to a high pressure accumulator. Liquid products and condensed unconverted material were flashed from the accumulator into a low pressure receiver in communication with a stabilizing column.

The C₄ hydrocarbon mixture used as the hydrocarbon portion of the charge in each of the runs had the following composition:

| | Percent by volume-liquid state |
|---|---|
| Propane and lighter | 5.9 |
| n-Butane | 46.8 |
| Isobutane | 13.5 |
| Alpha-butylene | 9.4 |
| Cis-beta-butylene | 7.5 |
| Trans-beta-butylene | 14.3 |
| Isobutylene | 0.0 |
| Pentanes | 1.4 |
| Hexanes and higher | 1.2 |

The reactions were executed with a reactor pressure of 75 pounds per square inch and a contact time of 20 seconds. The particular catalyst employed, ratio of hydrogen sulfide to hydrocarbon charge, reaction temperature, length of run and yield of thiophene obtained, in each of the runs are indicated by the follwing table. The yield is expressed as pounds of total liquid product per pound of theoretically possible thiophene.

| Run | Catalyst | Temp., °C. | Mole ratio of hydrogen sulfide to hydrocarbons in the charge | Length of run, Hours | Yield, Per Cent |
|---|---|---|---|---|---|
| A | Adsorptive alumina ("activated alumina"). | 594 | 1.1:1 | 5.5 | 12.7 |
| B | Adsorptive Bauxite (Porocel). | 594 | 1:1 | 4.0 | 12.5 |
| C | Adsorptive Bauxite (Porocel). | 594 | 3.5:1 | 5.5 | 23.0 |
| D | Adsorptive Bauxite (Porocel).¹ | 594 | 3.6:1 | 5.75 | 18.6 |
| E | Adsorptive Bauxite (Porocel). | 538 | 3.7:1 | 15.0 | 19.3 |
| F | Adsorptive Bauxite (Porocel). | 510 | 3.5:1 | 15.5 | 18.7 |

¹ This catalyst had been used in a previous operation and was regenerated prior to use in run D.

The total liquid product obtained in each of the runs was predominantly thiophenic. The total liquid product of runs C through F contained from 70 to 80 percent thiophenes. The total liquid product obtained in each of the runs A and C consisted of about 50% thiophene, 20 to 25% methyl thiophene, and traces of dimethyl thiophenes.

The process of the invention may be executed in any suitable type of apparatus enabling efficient contact of reactants with the catalyst. Hydrogen sulfide and unreacted hydrocarbons are separated from the reactor effluence by any suitable means and recycled to the reaction zone. Product separation may comprise such steps as, for example, solvent extraction, distillation, extractive distillation, adsorption and the like.

The process of the invention is executed in batch, semi-continuous or continuous operation. The reaction zone may include a plurality of separate reactors connected in series or in parallel. When a plurality of reactors connected in series are employed, all or a part of the reaction products may be separated from reactor effluence prior to introduction of the stream into the subsequent reactor of the series. Conditions within the reactors may be controlled to favor the production of thiophene in all of the reactors or they may be controlled to favor the production of hydrogen in one or more of the reactors.

The catalysts employed in the process of the invention may be subjected prior to use to a flushing operation with a suitable gaseous material, such as for example nitrogen, hydrogen, saturated hydrocarbons or the like, followed by a sweeping with hydrogen sulfide, or a hydrogen sulfide-containing gas. This pretreatment is preferably executed at an elevated temperature in the range of, for example, from about 400 to 750° C., and preferably in the range of from about 550 to about 650° C. The catalysts of the invention maintain their activity over prolonged periods of time under the conditions of operation of the process. When activity falls below that commensurate with practical or optimum operating conditions, the catalysts are subjected to a suitable regeneration treatment. Suitable regeneration conditions comprise such steps as the sweeping of the catalyst with an inert gas such as nitrogen, followed by passage therethrough of oxygen or an oxygen-containing gas. The regeneration is preferably effected at an elevated temperature preferably in the range outlined as suitable pretreating temperatures. The resulting regenerated catalysts are preferably pretreated prior to use as described above. Adsorptive alumina and adsorptive bauxite catalysts spent in the execution of the process of the invention and regenerated under the above-described conditions have enabled the attainment of yields as high as 80% and higher of those obtainable with fresh catalysts under otherwise identical operating conditions. The invention is, however, not limited to any particular method employed in the pretreatment and/or regeneration of the catalysts.

The invention claimed is:

1. A process for the production of thiophene which consists of contacting butylene in admixture with hydrogen sulfide in a molar ratio of hydrogen sulfide to butylene of from about 3:1 to about 4:1 with adsorptive alumina for a contact time in the range of from 10 to 30 seconds at a temperature of from about 500° C. to about 570° C. in a reaction zone, thereby reacting butylene with hydrogen sulfide in said reaction zone with the formation of thiophene, separating thiophene and unreacted hydrogen sulfide from the resulting reaction products, and recycling said separated hydrogen sulfide to said reaction zone.

2. A process for the production of thiophene which consists of contacting ethylene in admixture with hydrogen sulfide in a molar ratio of hydrogen sulfide to ethylene of from about 2:1 to about 6:1 with adsorptive alumina for a contact time in the range of from 10 to 30 seconds at a temperature of from about 450 to about 650° C. in a reaction zone, thereby reacting ethylene with hydrogen sulfide in said reaction zone with the formation of thiophene, separating thiophene and unreacted hydrogen sulfide from the resulting reaction products, and recycling said separated hydrogen sulfide to said reaction zone.

3. A process for the production of dimethylthiophene which consists of contacting propylene in admixture with hydrogen sulfide in a molar ratio of hydrogen sulfide to propylene of from about 2:1 to about 6:1 with adsorptive alumina for a contact time in the range of from 10 to 30 seconds at a temperature of from about 450° C. to about 650° C. in a reaction zone, thereby reacting propylene with hydrogen sulfide with the formation of dimethylthiophene in said reaction zone, separating dimethylthiophene and hydrogen sulfide from the resulting reaction products, and recycling said separated hydrogen sulfide to said reaction zone.

4. A process for the production of thiophenes which consists of contacting a normally gaseous mono-olefin in admixture with hydrogen sulfide in a molar ratio of hydrogen sulfide to olefin of from about 2:1 to about 6:1 with adsorptive alumina for a contact time in the range of from 10 to 30 seconds at a temperature of from about 400° C. to about 750° C. in a reaction zone, thereby reacting said olefin with hydrogen sulfide with the formation of thiophenes in said reaction zone, separating thiophenes and hydrogen sulfide from the resulting reaction products, and recycling said separated hydrogen sulfide to said reaction zone.

5. A process for the production of thiophenes which consists of contacting a normally gaseous mono-olefin in admixture with hydrogen sulfide in a molar ratio of hydrogen sulfide to olefin of from about 2:1 to about 6:1 with bauxite for a contact time in the range of from 10 to 30 seconds at a temperature of from about 450° C. to about 650° C. in a reaction zone, thereby reacting said olefin with hydrogen sulfide with the formation of thiophenes in said reaction zone, separating thiophenes and hydrogen sulfide from the resulting reaction products, and recycling said separated hydrogen sulfide to said reaction zone.

6. A process for the production of thiophenes which consists of contacting normally gaseous hydrocarbons comprising a mono-olefin in admixture with hydrogen sulfide in a molar ratio of hydrogen sulfide to olefin of from about 2:1 to about 6:1 with adsorptive alumina for a contact time in the range of from 10 to 30 seconds at a temperature of from about 450° C. to about 650° C. in a reaction zone, thereby reacting said olefin with hydrogen sulfide with the formation of thiophenes in said reaction zone, separating thiophenes and hydrogen sulfide from the resulting reaction products, and recycling said separated hydrogen sulfide to said reaction zone.

WALTER G. APPLEBY.
ALBIN F. SARTOR.

REFERENCES CITED

The following references are of record in the file of this patent:

UNITED STATES PATENTS

| Number | Name | Date |
| --- | --- | --- |
| 2,131,089 | Beeck | Sept. 27, 1938 |
| 2,315,107 | Chickinoff | Mar. 30, 1943 |
| 2,336,916 | Arnold | Dec. 14, 1943 |
| 2,369,377 | Thacker | Feb. 13, 1945 |
| 2,428,727 | Thacker | Oct. 7, 1947 |
| 2,474,440 | Smith | June 28, 1949 |

OTHER REFERENCES

Maihle, "Chemie and Industrie," vol. 31, pages 255–261 (1934).

Berkman, "Catalysis," page 1029, Reinhold Publishing Corp., New York, 1940.